United States Patent
Laksono

(10) Patent No.: US 9,826,259 B2
(45) Date of Patent: Nov. 21, 2017

(54) MANAGED DEGRADATION OF A VIDEO STREAM

(75) Inventor: Indra Laksono, Richmond Hill (CA)

(73) Assignee: VIXS SYSTEMS INC., Toronto (CA)

( * ) Notice: Subject to any disclaimer, the term of this patent is extended or adjusted under 35 U.S.C. 154(b) by 1730 days.

(21) Appl. No.: 11/344,512

(22) Filed: Jan. 31, 2006

(65) Prior Publication Data

US 2006/0193380 A1    Aug. 31, 2006

Related U.S. Application Data

(63) Continuation of application No. 09/823,646, filed on Mar. 30, 2001, now Pat. No. 8,107,524.

(51) Int. Cl.
*H04N 21/2662* (2011.01)
*H04N 21/2343* (2011.01)
(Continued)

(52) U.S. Cl.
CPC ..... *H04N 21/234354* (2013.01); *H04N 19/40* (2014.11); *H04N 21/234363* (2013.01);
(Continued)

(58) Field of Classification Search
CPC .................. H04N 19/00533; H04N 19/00539
(Continued)

(56) References Cited

U.S. PATENT DOCUMENTS

| 4,866,395 A | 9/1989 | Hosteller |
| 5,027,203 A | 6/1991 | Samad et al. |

(Continued)

FOREIGN PATENT DOCUMENTS

| EP | 0661826 A2 | 7/1995 |
| EP | 0739138 | 10/1996 |

(Continued)

OTHER PUBLICATIONS

Ciciora, Walter S., "Cable Television in the United States: An Overview," May 25, 1995, pp. 1-90, Cable Television Laboratories, Inc., Louisville, Colorado.

(Continued)

*Primary Examiner* — Andy Rao

(57) ABSTRACT

A system and a method for simultaneous transmission of multiple media streams in a fixed bandwidth network are disclosed herein. The system is comprised of a central gateway media server and a plurality of client receiver units. The input media streams arrive from an external source and are then transmitted to the client receiver units in a compressed format. A state machine on the gateway media server detects if the network bandwidth is close to saturation. In one embodiment, the potential bandwidth saturation is measured by matching the time when the start of unit of media for each stream against the estimated transmission time for that unit. When any one actual transmission time exceeds its estimated transmission time by a predetermined threshold value, the network is deemed to be close to saturation, or already saturated, and the state machine executes a process of selecting at least one stream as a target for lowering total bandwidth usage. Once the target stream associated with a client receiver unit is chosen, the amount of data transmitted by the target stream is reduced, which could result in a lower data transmission rate. In one embodiment, the amount of data is reduced by a gradual degradation of the precision of the data, resulting in a greater potential for data compression, and/or by gradually reducing the resolution of the data of the target stream.

19 Claims, 4 Drawing Sheets

ABFM State Machine 3 step escalation

(51) Int. Cl.
  H04N 21/24     (2011.01)
  H04N 21/258    (2011.01)
  H04N 21/262    (2011.01)
  H04N 21/4363   (2011.01)
  H04N 19/40     (2014.01)

(52) U.S. Cl.
  CPC ... *H04N 21/2402* (2013.01); *H04N 21/25808* (2013.01); *H04N 21/25825* (2013.01); *H04N 21/2662* (2013.01); *H04N 21/26233* (2013.01); *H04N 21/4363* (2013.01)

(58) Field of Classification Search
  USPC ............ 375/240.01–240.06, 240.12–240.16, 375/240.25–240.26
  See application file for complete search history.

(56) References Cited

U.S. PATENT DOCUMENTS

| | | | |
|---|---|---|---|
| 5,093,847 A | 3/1992 | Cheng | |
| 5,115,812 A | 5/1992 | Sano et al. | |
| 5,253,056 A | 10/1993 | Puri | |
| 5,475,434 A | 12/1995 | Kim | |
| 5,563,950 A | 10/1996 | Easter et al. | |
| 5,602,589 A | 2/1997 | Vishwanath et al. | |
| 5,635,985 A | 6/1997 | Boyce et al. | |
| 5,644,361 A | 7/1997 | Ran et al. | |
| 5,652,749 A | 7/1997 | Davenport et al. | |
| 5,732,391 A | 3/1998 | Fiocca | |
| 5,737,020 A | 4/1998 | Hall et al. | |
| 5,740,028 A | 4/1998 | Sugiyama et al. | |
| 5,784,572 A | 7/1998 | Rostoker et al. | |
| 5,812,195 A | 9/1998 | Zhang | |
| 5,841,473 A * | 11/1998 | Chui et al. .................. | 348/390.1 |
| 5,844,545 A | 12/1998 | Suzuki et al. | |
| 5,850,443 A | 12/1998 | Van Oorschot et al. | |
| 5,940,130 A | 8/1999 | Nilsson et al. | |
| 5,953,046 A | 9/1999 | Pocock | |
| 5,959,677 A * | 9/1999 | Date et al. ................ | 375/240.01 |
| 5,996,029 A | 11/1999 | Sugiyama et al. | |
| 6,005,623 A | 12/1999 | Takahashi et al. | |
| 6,005,624 A | 12/1999 | Vainsencher | |
| 6,014,694 A | 1/2000 | Aharoni et al. | |
| 6,026,097 A | 2/2000 | Voois et al. | |
| 6,040,863 A | 3/2000 | Kato | |
| 6,081,295 A | 6/2000 | Adolph et al. | |
| 6,091,777 A | 7/2000 | Guetz et al. | |
| 6,139,197 A | 10/2000 | Banks | |
| 6,141,693 A | 10/2000 | Perlman et al. | |
| 6,144,402 A | 11/2000 | Norsworthy et al. | |
| 6,167,084 A | 12/2000 | Wang et al. | |
| 6,182,203 B1 | 1/2001 | Simar, Jr. et al. | |
| 6,215,821 B1 | 4/2001 | Chen | |
| 6,219,358 B1 | 4/2001 | Pinder et al. | |
| 6,222,886 B1 | 4/2001 | Yogeshwar | |
| 6,236,683 B1 | 5/2001 | Mougeat et al. | |
| 6,252,905 B1 * | 6/2001 | Pokrinchak et al. .... | 375/240.14 |
| 6,259,741 B1 | 7/2001 | Chen et al. | |
| 6,263,022 B1 | 7/2001 | Chen et al. | |
| 6,300,973 B1 | 10/2001 | Feder et al. | |
| 6,307,939 B1 | 10/2001 | Vigarie | |
| 6,314,138 B1 | 11/2001 | Lemaguet | |
| 6,323,904 B1 | 11/2001 | Knee | |
| 6,366,614 B1 | 4/2002 | Pian et al. | |
| 6,385,248 B1 | 5/2002 | Pearlstein et al. | |
| 6,438,168 B2 | 8/2002 | Arye | |
| 6,480,541 B1 | 11/2002 | Girod et al. | |
| 6,526,099 B1 | 2/2003 | Christopoulos et al. | |
| 6,529,146 B1 | 3/2003 | Kowalski et al. | |
| 6,536,043 B1 * | 3/2003 | Guedalia .................. | 725/90 |
| 6,549,561 B2 | 4/2003 | Crawford | |
| 6,584,509 B2 | 6/2003 | Putzolu | |
| 6,591,013 B1 | 7/2003 | Taunton | |
| 6,637,029 B1 | 10/2003 | Maissel et al. | |
| 6,639,943 B1 * | 10/2003 | Radha et al. ............ | 375/240.11 |
| 6,674,477 B1 * | 1/2004 | Yamaguchi et al. ....... | 348/387.1 |
| 6,714,202 B2 | 3/2004 | Dorrell | |
| 6,724,726 B1 | 4/2004 | Coudreuse | |
| 6,748,020 B1 | 6/2004 | Eifrig et al. | |
| 6,751,405 B1 * | 6/2004 | Hasegawa ..................... | 386/111 |
| 6,771,703 B1 | 8/2004 | Oguz et al. | |
| 6,792,047 B1 | 9/2004 | Bixby et al. | |
| 6,907,081 B2 * | 6/2005 | Mantchala et al. ...... | 375/240.26 |
| 6,928,113 B1 * | 8/2005 | Mihara ..................... | 375/240.05 |
| 6,959,041 B2 * | 10/2005 | Ishiyama ................. | 375/240.02 |
| 6,985,966 B1 | 1/2006 | Gupta et al. | |
| 2001/0026591 A1 | 10/2001 | Keren et al. | |
| 2002/0106022 A1 | 8/2002 | Takahashi et al. | |
| 2002/0110193 A1 | 8/2002 | Yoo et al. | |
| 2002/0138259 A1 | 9/2002 | Kawahara | |
| 2002/0140851 A1 | 10/2002 | Laksono | |
| 2002/0145931 A1 | 10/2002 | Pitts | |
| 2002/0196851 A1 | 12/2002 | Lecoutre | |
| 2003/0093661 A1 | 5/2003 | Loh et al. | |
| 2003/0152148 A1 | 8/2003 | Laksono | |
| 2007/0053428 A1 | 3/2007 | Saleem et al. | |

FOREIGN PATENT DOCUMENTS

| | | |
|---|---|---|
| EP | 0805599 A2 | 11/1997 |
| EP | 0855805 A2 | 7/1998 |
| EP | 0896300 B1 | 2/1999 |
| EP | 0901285 | 3/1999 |
| EP | 0955607 A2 | 11/1999 |
| EP | 1032214 A2 | 8/2000 |
| EP | 1087625 A2 | 3/2001 |
| JP | 07210670 A | 8/1995 |
| JP | 11289350 | 10/1999 |
| WO | 9935852 | 7/1999 |
| WO | 0195633 A2 | 12/2001 |
| WO | 02080518 A2 | 10/2002 |

OTHER PUBLICATIONS

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG2003061S0070> retrieved Jul. 8, 2003.

Youn, Jeongnam et al., "Video Transcoding for Multiple Clients," Proceedings of the SPIE, Bellingham, VA, vol. 4067, XP008012075, pp. 76-85, University of Washington, Sealttle, WA.

Lengwehasatit, Krisda et al.. "Computationally Scalable Partial Distance Based Fast Search Motion Estimation," Packet Video Corp., San Diego, California.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding For-

(56) References Cited

OTHER PUBLICATIONS mats," IEEE Transactions on Multimedia, vol. 2, No. 2, Jun. 2000, pp. 101-110, Engineering and Physical Sciences Researc Counsel, Colchester, U.K.
Wiegand, Thomas et al., "Long-Term Memory Motion-Compensated Prediction for Rubust Video Transmittion," in Proc. ICIP 2000, University of Erlangen-Buremberg, Erlangen, Germany.
Fan, Zhigang et al. "Maximum Likelihood Estimation of JPEG Quantization Table in the Identification of Bitmap Compression History," Xerox Corporation, Webster, New York.
Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.
Ramanujan, Ranga S. et al., "Adaptive Streaming of MPEG Video Over IP Networks," 22nd IEEE Conference on Local Computer Networks (LCN '97), Nov. 2-5, 1997, 1997 IEEE, pp. 398-409, Architecture Technology Corporation, Minneapolis, MN.
Rejaie, Reza et al., "Architectural Considerations for Playback of Quality Adaptive Video Over the Internet," XP002177090, 2000 IEEE pp. 204-209, AT&T Labs, Menlo Park, California.
Bouras, C. et al.,"On-Demand Hypermedia/Multimedia Service Over Broadband Networks," XP-002180545, 1996 IEEE Proceedings of HPDC-5 '96, pp. 224-230, University of Patras, Patras, Greece.
Chalidabhongse, Junavit et al., "Fast Motion Vector Estimation Using Multiresolution-Spatio-Temporal Correlations," IEEE Transactions on Circuits and Systems for Video Technology, vol. 7, No. 3 Jun. 1997, pp. 477-488.
Oh, Hwang-Seok et al., "Block-Matching Algorithm Based on an Adaptive Reduction of the Search Area for Motion Estimation," Real-Time Imaging, Academic Press Ltd., vol. 56, No. 5, Oct. 2000, pp. 407-414, XP004419498 ISSN: 1077-2014 , Taejon, Korea.
Lee, Liang-Wei et al., "Dynamic Search-Window Adjustment and Interlaced Search for Block-Matching Algorithm," IEEE Transactions on Circuits and Systems for Video Technology, IEEE, vol. 3, No. 1, Feb. 3, 1993, pp. 85-87, XP000334581 ISSN: 1051-8215, New York.
Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688.
Kroner, Sabine et al., "Edge Preserving Noise Smoothing With an Optimized Cubic Filter," DEEI, University of Trieste, Trieste, Italy.
Kim, Jaemin et al., "Spatiotemporal Adaptive 3-D Kalman Filter for Video," pp. 1-12. Samsung Semiconductor, Inc. San Jose, Calfiornia.
Liu, Julia J., "ECE497KJ Course Project: Applications of Wiener Filtering in Image and Video De-Noising," pp. 1-15, May 21, 1997.
Jostschulte, K. et al., "A Subband Based Spatio-Temporal Noise Reduction Technique for Interlaced Video Signals," University Dortmund, Dortmund, Germany.
Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.
Tourapis, Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.
Brandenburg, Karlheinz, "MP3 and AAC Explained," Proceedings of AES 17th International Conference, XP008004053, pp. 99-110, Erlangen, Germany.
Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.
Kan, Kou-Sou et al., "Low-Complexity and Low-Delay Video Transcoding for Compressed MPEG-2 Bitstream," Natinal Central University, Chung-Li, Taiwan.
Mitchell et al., "MPEG Video Compression Standard: 15.2 Encorder and Decorder Buffering," Chapman and Hall Digital Multimedia Standards Series, pp. 340-356, XP002115299, ISBN: 0-412-08771-5, Chapman and Hall, New York.
Whybray, M.W. et al., "Video Coding—Techniques, Standards and Applications," BT Technol J. vol. 14, No. 4, Oct. 4, 1997, pp. 86-100, XP000722036.
"Sharp Product Information: VTST-Series NTSC/PAL Electronic Television Tuners," RF Components Group, Sharp Microelectronics of the America, 1997.
Edwards, Larry M., "Satisfying Your Need for Net Speed," San Diego Metropolitan, Sep. 1999, <<www.sandiegometro.com/1999/sept/speed.html>>, retrieved on Jul. 19, 2001.
Oz, Ran et al., "Unified Headend Technical Management of Digital Services," BigBend Networks, Inc.
Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.
"CONEXANT Products & Tech Info: Product Briefs: CX24108," 2000-2002 Conexant Systems, Inc. access on Apr. 20, 2001.
"CONEXANT Products & Tech Info: Product Briefs: CX22702," 2000-2002 Conexant Systems, Inc. access on Apr. 20, 2001.
Telecom Design Communications Ltd., U.K., <<http://www.tdc.co.uk/modmulti/settop/index.htm>>, access on Apr. 20, 2001.
"White Paper: Super G: Maximizing Wireless Performance," Mar. 2004, Atheros Communications, Inc., pp. 1-20, Document No. 991-00006-001, Sunnyvale, California.
Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.
Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.
Razavi, Behzad, "Challenges in Portable RF Transceiver Design," Sep. 1996, 1996 IEEE, pp. 12-25, Circuits & Devices.
Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.
"ICE Fyre Semiconductor: IceFyre 5-GHz OFDM Modem Solution," Sep. 2001, pp. 1-6, ICEFYRE: Rethink Wireless, IceFyre Semiconductor, Inc.
Pozar, David M., "Theory and Design of Ferrimagnetic Components," 1990, pp. 529, Microwave Engineering, Addison-Wesley Publishing Company, Inc.
"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rInformation Technology, IEEE Std 802.11a-1999, LAN/MAN Standards Committee.
U.S. Appl. No. 09/823,646, Final Office Action mailed Aug. 4, 2009.
Abstract and partial translation of JP 11-289350.
U.S. Appl. No. 09/823,646 Office Action mailed Feb. 4, 2009 9 pgs.
U.S. Appl. No. 09/823,646 Final Office Action mailed Aug. 4, 2009 12 pgs.
U.S. Appl. No. 09/823,646 Office Action mailed Feb. 16, 2010 9 pgs.
U.S. Appl. No. 09/823,646, Final Office Action mailed Jun. 22, 2010, 11 pages.
U.S. Appl. No. 09/823,646, Office Action mailed Feb. 17, 2011, 9 pages.
U.S. Appl. No. 11/553,210, Office Action mailed May 11, 2011, 2011, 30 pages.

(56) References Cited

OTHER PUBLICATIONS

Japanese Examination Report,Translation, Mar. 11, 2008, 4 pages.
Actions on the Merits by the U.S.P.T.O. as of Jun. 13, 2008, 4 pages.

* cited by examiner

Reveiver Client System Block Diagram

MANAGED DEGRADATION OF A VIDEO STREAM

CROSS-REFERENCE TO RELATED APPLICATION

The present disclosure is a continuation of U.S. patent application Ser. No. 09/823,646, filed Mar. 30, 2001 and entitled "ADAPTIVE BANDWIDTH FOOTPRINT MATCHING FOR MULTIPLE COMPRESSED VIDEO STREAMS IN A FIXED BANDWIDTH NETWORK".

FIELD OF THE DISCLOSURE

The present invention relates generally to media data transmission and more particularly to reducing bandwidth overload.

BACKGROUND

A number of media playback systems use continuous media streams, such as video image streams, to output media content. However, some continuous media streams in their raw form often require high transmission rates, or bandwidth, for effective and/or timely transmission. In many cases, the cost and/or effort of providing the required transmission rate is prohibitive. This transmission rate problem is often solved by compression schemes that take advantage of the continuity in content to create highly packed data. Compression methods such Motion Picture Experts Group (MPEG) methods and its variants for video are well known in the art. MPEG and similar variants use motion estimation of blocks of images between frames to perform this compression. With extremely high resolutions, such as the resolution of 1920×1080i used in high definition television (HDTV), the data transmission rate of such a video image stream will be very high even after compression.

One problem posed by such a high data transmission rate is data storage. Recording or saving high resolution video image streams for any reasonable length of time requires considerably large amounts of storage that can be prohibitively expensive. Another problem presented by a high data transmission rate is that many output devices are incapable of handling the transmission. For example, display systems that can be used to view video image streams having a lower resolution may not be capable of displaying such a high resolution. Yet another problem is the limitations on continuous media streaming in systems with a fixed bandwidth or capacity. For example, in a local area network with multiple receiving/output devices, such a network will often have a fixed bandwidth or capacity, and hence be physically and/or logistically incapable of simultaneously supporting multiple receiving/output devices.

Given the limitations, as discussed, it is apparent that a method and/or system that overcome at least some of these limitations would be advantageous.

DETAILED DESCRIPTION OF THE FIGURES

In accordance with at least one embodiment of the present invention, a display data is received. It is determined if a predetermined criteria is met by a first representation of the display data, wherein the first representation of the display data includes a first plurality of display streams to be transmitted to a second plurality of display devices. A first display stream of the first plurality of display streams is compressed in a first manner when it is determined that the first representation of the display does not meet the predetermined criteria. An advantage of the present invention is that networks for broadcasting of media streams are implemented more efficiently. Another advantage of the present invention is that multiple media streams may be transmitted to multiple users on a fixed bandwidth network by managing degradation in transmission quality.

FIGS. 1-4 illustrate a system and a method for transmission of multiple data streams in a network capable of supporting a fixed bandwidth. The system includes a central gateway media server and a plurality of client receiver units. The input data streams arrive from an external source, such as a satellite television transmission, or physical head end, and are transmitted to the client receiver units in a compressed format. The data streams can include display data, graphics data, digital data, analog data, multimedia data, and the like. An Adaptive Bandwidth Footprint Matching state machine on the gateway media server detects if the network bandwidth is close to saturation. The start time of each unit of media for each stream is matched against the estimated transmission time for that unit. When any one actual transmission time exceeds its estimated transmission time by a predetermined threshold, the network is deemed to be close to saturation, or already saturated, and the state machine will execute a process of selecting at least one stream as a target for lowering total bandwidth usage. Once the target stream associated with a client receiver unit is chosen, the target stream is modified to transmit less data, which may result in a lower data transmission rate. For example, a decrease in the data to be transmitted can be accomplished by a gradual escalation of the degree of data compression performed on the target stream, thereby reducing the resolution of the target stream. If escalation of the degree of data compression alone does not adequately reduce the data to be transmitted to prevent bandwidth saturation, the resolution of the target stream can also be reduced. For example, if the target stream is a video stream, the frame size could be scaled down, reducing the amount of data per frame, and thereby reducing the data transmission rate.

Figure 1:
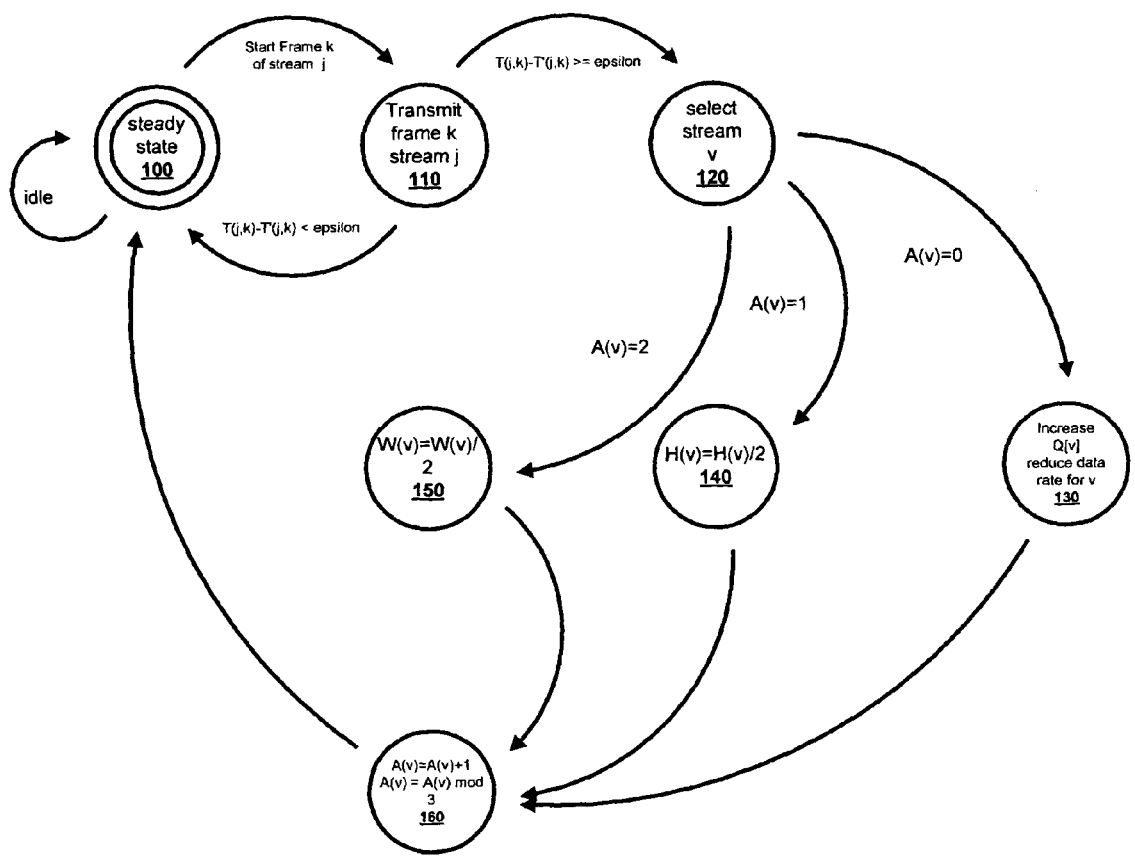
FIG. 1 is a state machine diagram illustrating an Adaptive Bandwidth Footprint Matching implementation according to at least one embodiment of the present invention.

Referring now to FIG. 1, a state machine diagram of an Adaptive Bandwidth Footprint Matching (ABFM) method with three kinds of degradation is illustrated according to at least one embodiment of the present invention, where degradation is used to reduce amount of data and/or the data rate associated with a given data stream. Although the following discussion makes use of video streams for ease of illustration, other data formats, such as audio, display, analog, digital, multimedia, and the like, may be used in accordance with various embodiments. In steady state 100, each video stream of a plurality of video streams is operating within acceptable parameters. In at least one embodiment, a video stream is determined to be acceptably operating when the transmission of a frame of video data is transmitted without exceeding a maximum allowed delay time. For example, digital video streams such as MPEG often have time stamp information embedded within the stream. In addition to the start time $T0$ (when the frame was successfully transmitted) of the first frame in a sequence of frames with a fixed interframe time, this time stamp information, including the known interframe time (which is fixed for a sequence of frames), can be used to calculate the estimated times of each frame as they arrive. For example, in one embodiment, the estimated time of frame transmission completion $T'j$ for frame N is calculated as $T'j(N)=T0+N*D$, where D is the interframe time. In this case, if the estimated times for transmission of the start of each frame of a stream j is within acceptable limits and has not exceed a maximum allowed delay $Dj$, stream j can be considered as operating within acceptable parameters. The acceptable parameters may be set by an administrator, determined empirically, and the like.

The desired tolerance $Dj$ (or maximum acceptable delay time) can be calculated using a variety of methods. In one embodiment, the method used is to take into consideration the buffering size of each client receiver unit, and ensure that the client receiver unit will not run out of media content to decode. A typical formula to calculate $Dj$ is to take the size of the buffer and estimate a lower bound (in units of time) to consume, or fill, the buffer. As it is often desirable to keep the buffer of each client receiver unit as full as possible, a typical $Dj$ will be calculated as $Dj=Tj(estimate)/2$. Where $Tj(estimate)$ is the estimated lower time bound to completely consume the input buffer of a receiver unit associated with stream j. Alternately, instead of using ½ of $Tj$ (estimate), a more aggressive approach would be to use ¾ of $Tj$(estimate), and a more conservative approach might take ⅓ of $Tj$(estimate). In cases where $Tj$(estimate) is small for receiver devices that are incapable of providing considerable buffer space, a conservative approach may be more appropriate. In one embodiment, $Tj$(estimate) is obtained by taking observed peak (highest) data rate (in bytes/second) of stream j and the smallest size of the buffers (in bytes) of all the devices receiving stream j. In this case, $Tj$(estimate) can be evaluated as $Bp/Rp$, where Bp is the receive buffer size of device p and Rp is the peak data rate of stream j associated with device p, where device p receives stream j and has the smallest receive buffer. Alternately, Rp can be associated with any value between the mean (average) and the peak. In one embodiment, the peak data rate (Rp) can be based on the largest compressed frame. If the receiving client unit does not have enough buffering capability for at least one compressed frame then it is unlikely to be able to display the video smoothly without dropping frames.

At the commencement of each unit of media, such as a frame of video, the ABFM state machine transitions to state 110. In state 110, the actual transmit time Tj (the actual time of frame transmission completion) is compared against the estimated transmit time T'j (the expected time of frame transmission completion) at the start of each frame of stream j. In one embodiment, if the actual time of frame transmission completion exceeds the estimated time by less than the desired tolerance Dj (i.e. $Tj-T'j<Dj$), the ABFM state machine returns to steady state 100. Otherwise, if the actual transmit time exceeds the estimated time by at least desired tolerance Dj (i.e. $Tj-T'j>=Dj$), the ABFM state machine enters state 120.

In state 120, a victim stream v is selected from the plurality of video streams. In one embodiment, victim stream v is selected using a predetermined selection method, such as by round robin selection where each video stream is chosen in turn. In another embodiment, the victim stream v is selected based on a fixed priority scheme where lower priority streams are always selected before any higher priority scheme. In yet another embodiment, the victim stream v is selected based on a weighted priority scheme where the stream having the greatest amount of data and/or the priority of each stream plays a role in its probability of selection.

Regardless of the method of selecting a victim stream v, in one embodiment, each stream j has a count, herein referred to as $A(j)$, that refers to the current degradation value of the modified stream of stream j. In this case, the current degradation value of victim stream v, $A(v)$, is evaluated in state 120. If $A(v)$ is 0, in one embodiment, the one or more quantization factors of the reencoding process for the victim stream v are changed in state 130, thus resulting in a decreased in the amount of data transmitted in victim stream v. In one embodiment, the quantization factors are increased resulting in a decrease in the amount of data transmitted in victim stream v. For example, the MPEG algorithm uses quantization factors to reduce the amount of data by reducing the precision of the transmitted video stream. MPEG relies on quantization of matrices of picture elements (pixels) or differences in values of pixels to obtain as many zero elements as possible. The higher the quantization factors, the more zero elements produced. Using algorithms such as run-length encoding, video streams (or their associated matrices) containing more zeros can be more highly compressed than video streams having fewer zeros.

For example, the MPEG algorithm for compression of a video stream has a stage in the algorithm for a discrete cosine transform (DCT), a special type of a Fourier Transform. The DCT is used to transform blocks of pixels in the time domain to the frequency domain. As a result of this transformation, the elements in the frequency domain, post-DCT, that are closest to the top left element of the resulting matrix with indices (0,0) are weighted more heavily compared to elements at the bottom right of the matrix. If the matrix in the frequency domain were to use less precision to represent the elements in the lower right half of the matrix of elements, the smaller values in the lower right half will get converted to zero if they are below a threshold based on a quantization factor. Dividing each element by a quantization factor is one method utilized to produce more zero elements. MPEG and related algorithms often apply larger quantization values to decrease the precision of the matrices in the frequency domain, resulting in more zero elements, and hence a decrease the data transmission rate.

After the reducing the data transmission of the victim stream v by modifying the quantization factor (state 130), in one embodiment, the ABFM state machine transitions to state 160, where the degradation value $A(v)$ is increased by one and then a modulus of 3 is applied, i.e. $A(v)current=(A(v)previous+1) \mod 3$. As a result, the value of $A(v)$ can cycle from 0 to 2. Since $A(v)$ was previously determined to be 1 in state 120, the new $A(v)$ value would be 1 (0+1 mod 3). After modifying the degradation value $A(v)$ for victim stream v in state 160, the ABFM state machine transitions back to state 100.

If $A(v)$ is determined to be 1 for victim stream v in state 120, the ABFM state machine enters state 140. In one embodiment, the height of the reencoded data stream is reduced by a predetermined amount, ½ for example, in state 140, resulting in a decreased amount of data to be transmitted. One method used to scale blocks of pixels by half is to blend and average pixels. Another method used is to drop every other pixel. In cases where the video stream is interlaced, halving the height can be achieved by dropping alternate fields, such as dropping all of the odd horizontal display rows or all of the even horizontal display rows. It will be appreciated that in some formats, particularly those in the National Television System Committee (NTSC) and the Advanced Television System Committee (ATSC) formats, video streams are interlaced where the even horizontal display rows for an entire frame are displayed first and then the odd horizontal display rows are displayed next. In other embodiments, the height of the reencoded data stream is reduced by a factor other than a half, such as ⅓, using similar methods as appropriate.

After the reducing the data transmission of the victim stream v by reducing the resolution of the stream (state 140), in one embodiment, the degradation value A(v) is modified in state 160, as discussed previously. The resulting value for A(v) is 2 (1+1 mod 3). After modifying the degradation value A(v) for victim stream v in state 160, the ABFM state machine transitions back to state 100.

If A(v) is determined to be 2 for victim stream v in state 120, the ABFM state machine enters state 150. In one embodiment, the width of the reencoded data stream is reduced by a predetermined amount in state 150 using methods similar to those discussed previously with reference to state 140, such as dropping every other pixel. It will be appreciated that for a same reduction factor, the reduction methods of state 140 or state 150 are interchangeable. In cases where the victim stream v is interlaced, halving the height before the width is generally more appropriate as it is more efficient to completely skip alternating fields, saving substantial processing requirements.

After the reducing the data transmission of the victim stream v by reducing the resolution of the stream (state 150), in one embodiment, the degradation value A(v) is modified in state 160, as discussed previously. The resulting value for A(v) is 0 (2+1 mod 3). After modifying the degradation value A(v) for victim stream v in state 160, the ABFM state machine transitions back to state 100.

In one embodiment, as a result of the cycling between 0 to 2 of the degradation value A(v) for a victim stream v, the ABFM state machine cycles through three different kinds of degradation of the resolution and/or the precision of victim stream v each time it is selected for degradation in state 120. Although an ABFM state machine utilizing three kinds of data degradation has been discussed, in other embodiments, fewer or more steps of data degradation may be used according to the present invention. For example, in one embodiment, an ABFM state machine utilizes multiple step degradation involving more than one state of changing of quantization factors. It will also be appreciated that scaling factors of width and height other than ½ (e.g.: ¾) may be used. For example, in one embodiment, the amount by which the resolution and/or precision of a victim stream v is based on the degree to which the actual frame transmission completion time for a frame of video in victim stream v exceeds the estimated frame transmission completion time. For example, if the actual frame transmission completion time is 10% greater than the estimated frame transmission completion time, then the resolution of victim stream v could be scaled down by 10%, thereby causing the actual frame transmission completion time to likely come closer to the estimated frame transmission completion time.

Figure 2:
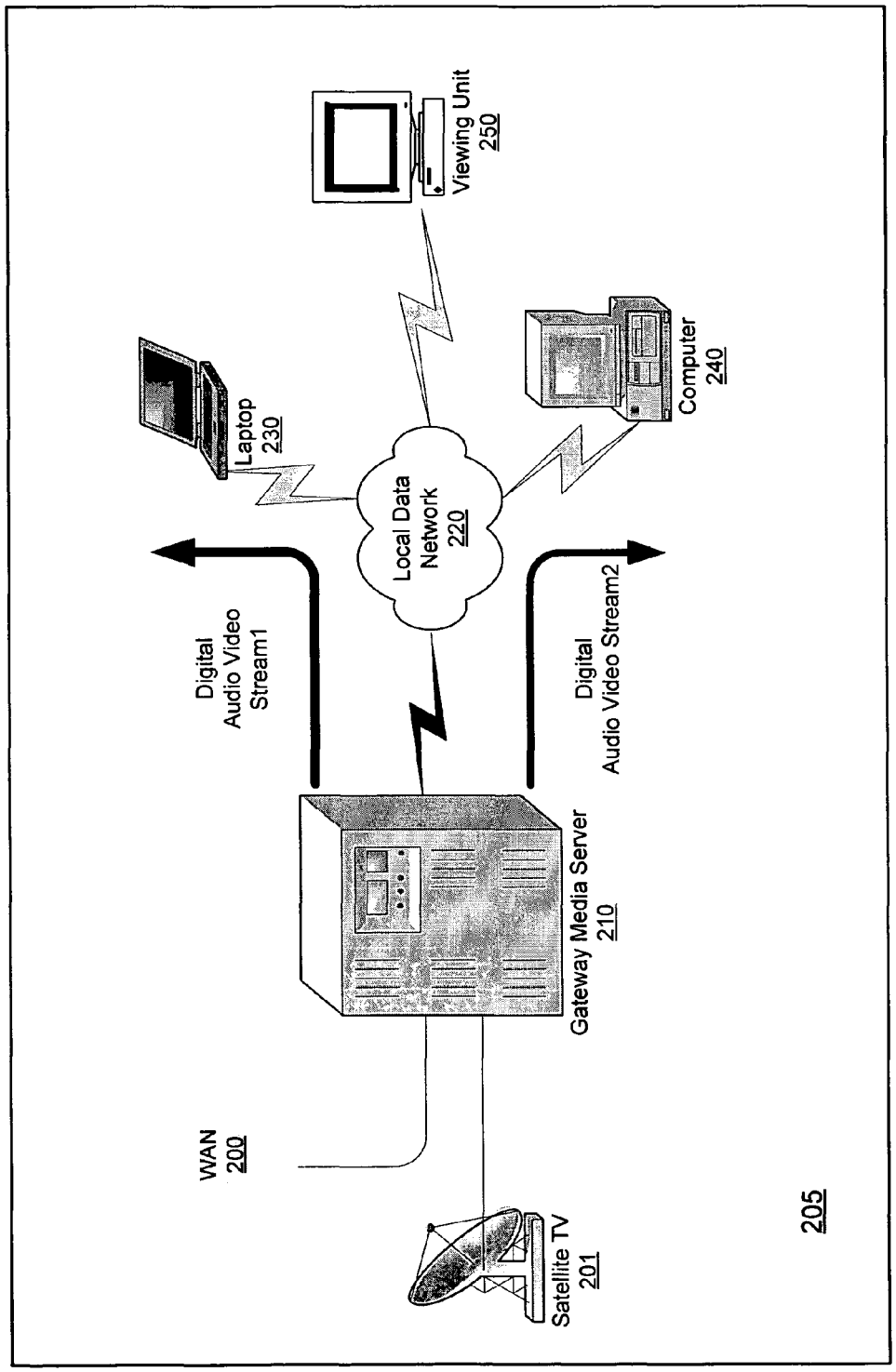
FIG. 2 is a system diagram illustrating a server system for implementing Adaptive Bandwidth Footprint Matching according to at least one embodiment of the present invention.

Referring next to FIG. 2, Adaptive Bandwidth Footprint Matching (ABFM) server system 205 is illustrated according to at least one embodiment of the present invention. Data streams, such as video data, display data, graphics data, MPEG data, and the like, are input to gateway media server 210. In one embodiment, two main inputs sources are used by gateway media server 210. One input is wide area network (WAN) connection 200 to provide high speed Internet access. The other input is a source of media streams, such as satellite television (using satellite dish 201) or cable television. In other embodiments, other input sources can be used, such as a local area network (LAN). WAN connection 200 and/or other used input sources which can include a network comprised of cable, twisted pair wires, fiber optic cable, a wireless radio frequency net work, and the like.

Gateway media server 210, in one embodiment, accepts one or more input data streams, such as digital video or display data, from satellite dish 201 and/or WAN 200. Each input data stream can include a plurality of multiplexed channels, such as MPEG data channels. Gateway media server 210 broadcasts the data streams and/or channels over a common medium (local data network 220) to one or more receiving client units, such as laptop 230, computer 240, or viewing unit 250. In one embodiment, there is a one-to-one correspondence between the number of data channels input to gateway media server 210 and the number of client receiver units to receive output data channels or streams. In another embodiment, there are fewer data channels or streams than there are receiver client units. In this case, two or more client receiver units may need to share one or more data channels or streams. Local data network 220 can include a local area network, a wide area network, a bus, a serial connection, and the like. Local data network 220 may be constructed using cable, twisted pair wire, fiber optic cable, etc. During broadcast of the data streams to the receiving client units, gateway media server 210, in one embodiment, applies the ABFM algorithm, as discussed previously with reference to FIG. 1, to manage the network traffic to assure consistent and sustained delivery within acceptable parameters, thereby allowing users to view the data stream seamlessly.

In at least one embodiment, the ABFM algorithm is utilized by gateway media server 210 to attempt to ensure that a representation of the display data meets a predetermined criteria. For example, gateway media server 210 may transmit the display data to receiver client units, where a video sequence displayed on the receiver client units is a representation of the displayed data. If the video sequence is simultaneously displayed properly in real time (the predetermined criteria) on a number receiver client units, gateway media server 210 may not need to take further action. Else if the video sequence is choppy, is not synchronized, is delayed, or is not received by all the designated receiver client units, the representation of the display data does not meet the predetermined criteria, and gateway media server 210, in one embodiment, uses the ABFM method previously discussed to modify one or more of the data streams of display data to improve the display of the video sequence.

As discussed previously, in at least one embodiment, an ABFM algorithm is implemented to maintain the data transmission rate of ABFM server system 205 within a fixed bandwidth. In one embodiment, the bandwidth of ABFM server system 205 is fixed by the maximum bandwidth of the transmission medium (local data network 225) between gateway media server 210 and the client receiver units (laptop 230, computer 240, or viewing unit 250). For example, if local data network is a local area network having a maximum transmission rate of 1 megabit per second, the bandwidth of ABFM server system 205 may be fixed at a maximum of 1 megabit per second. Alternately, in another embodiment, the bandwidth of ABFM server system 205 could be a predetermined portion of the available bandwidth of the transmission medium (local data network 225). For example, if there are four ABFM server systems 205 connected to local data network 225 having a maximum transmission rate of 1 megabit per second, each ABFM server systems 205 could be predetermined to have a fixed bandwidth of 0.25 megabits per second (one fourth of the maximum available transmission rate).

Although the transmission medium between gateway media server 210 and client receiver units is often the factor which limits or fixes the bandwidth of ABFM server system 205, in one embodiment, the bandwidth of ABFM server system 205 is fixed by the rate at which gateway media server 205 is able to input one or more data streams, compress one or more of the data streams, and output the compressed (and uncompressed) data streams or channels to the client receiver units. For example, if gateway media server 205 can only process 1 megabits of data per second, but local data network 225 has a transmission rate of 10 megabits per second, the bandwidth of ABFM server system 205 may be limited to only 1 megabits per second, even though local data network 225 can transmit at a higher transmission rate. It will be appreciated that the bandwidth of ABFM server system 205 could be limited by other factors without departing from the spirit or the scope of the present invention.

Figure 3:
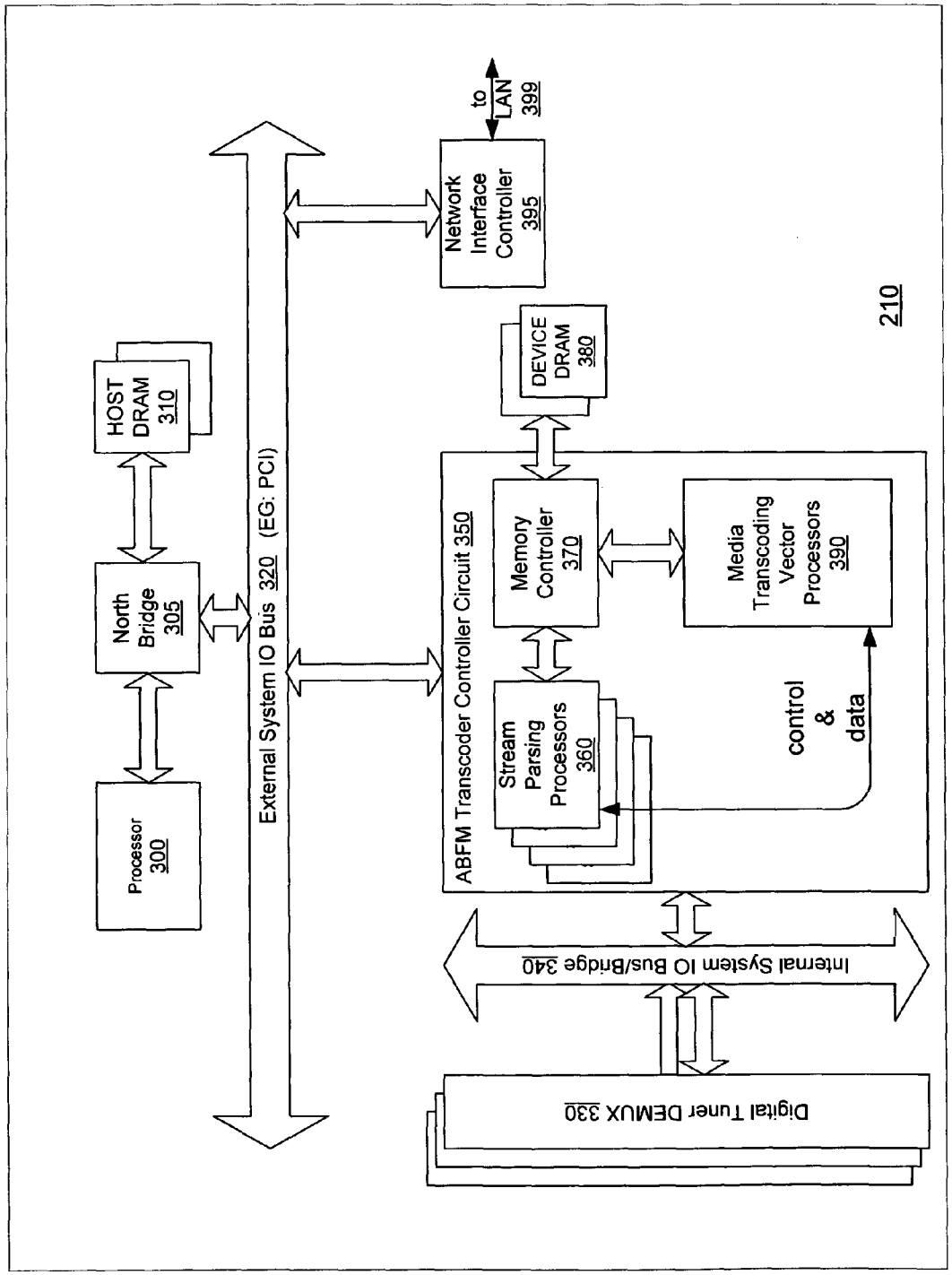
FIG. 3 is a block diagram illustrating components of a gateway media server according to at least one embodiment of the present invention.

Referring to FIG. 3, gateway media server 210 is illustrated in greater detail according to at least one embodiment of the present invention. Input media streams enter the system via digital tuner demultiplexors (DEMUX) 330, from which the appropriate streams are sent to ABFM transcoder controller circuit 350. ABFM transcoder controller circuit 350, in one embodiment, includes one or more stream parsing processors 360 that perform the higher level tasks of digital media decoding, such as video decoding. Stream parsing processors 360 drive a series of media transcoding vector processors 390 that perform the low level media transcoding tasks. The intermediate and final results of the decoding and transcoding are stored in the device memory, such as dynamic random access memory (DRAM) 380. The final compressed transcoded data, in one embodiment, is transmitted according to a direct memory access (DMA) method via external system input/output (10) bus 320 past north bridge 305 into the host memory (host DRAM 310). Processor 300, using a timer driven dispatcher, at an appropriate time, will route the final compressed transcoded data stored in host DRAM 310 to network interface controller 395, which then routes the data to local area network (LAN) 399.

Figure 4:
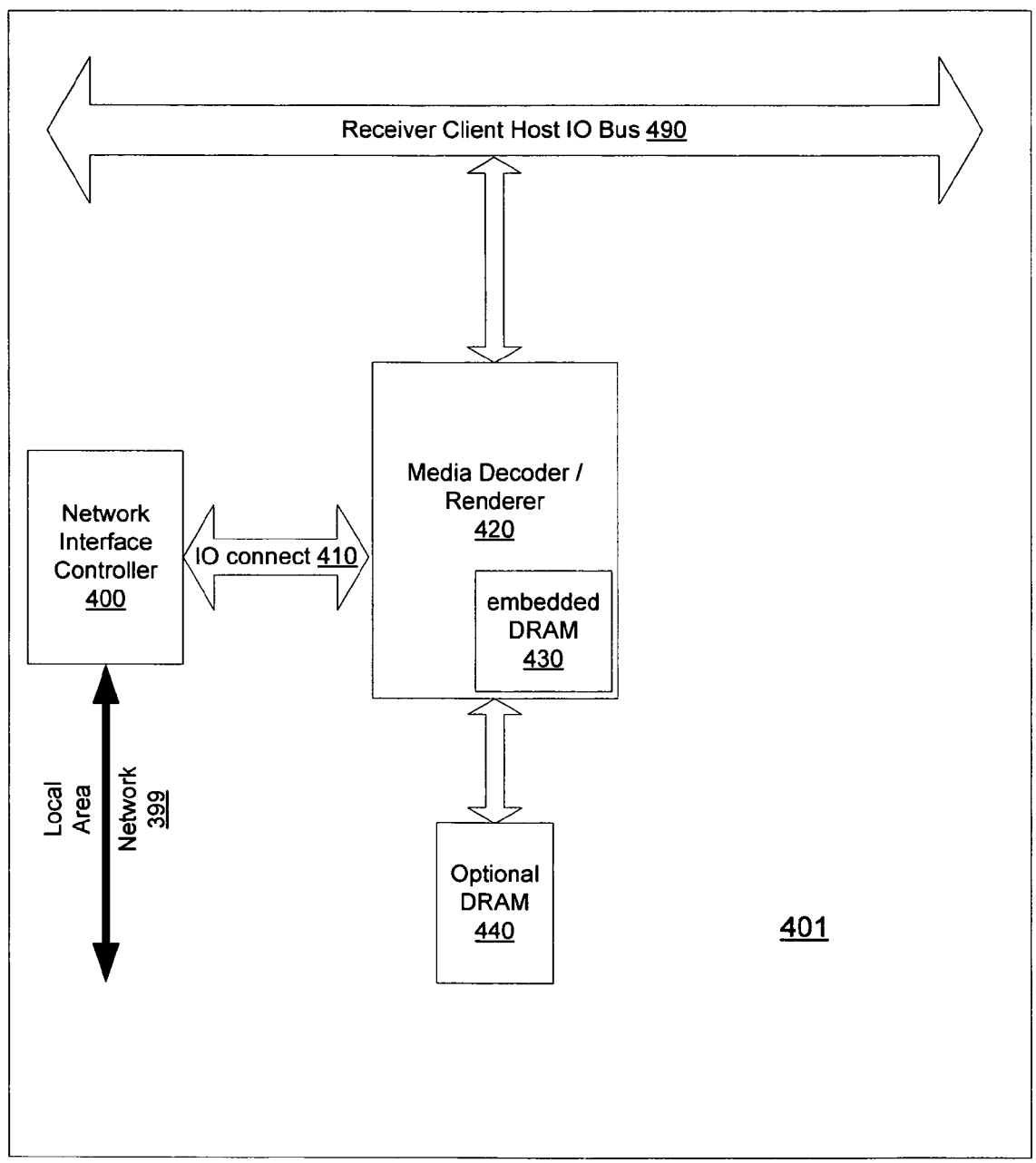
FIG. 4 is a block diagram illustrating components of a receiver client unit according to at least one embodiment of the present invention.

Referring next to FIG. 4, receiver client unit 401 is illustrated according to at least one embodiment of the present invention. Receiver client unit 401 can include devices capable of receiving and/or displaying media streams, such laptop 230, computer 240, and viewing unit 250 (FIG. 2). The final compressed transcoded data stream as discussed with reference to FIG. 3 is transmitted to network interface controller 400 via LAN 399. The data stream is then sent to media decoder/renderer 420 via IO connect 410. IO connect 410 can include any IO connection method, such as a bus or a serial connection. Media decoder/renderer 420, in one embodiment, includes embedded DRAM 430 which can be used as an intermediate storage area to store the decoded data. In cases where the decoded data does not fit within embedded DRAM 430, media decoder/renderer 420 further includes DRAM 440 which is larger than embedded DRAM 430. As the compressed data is decoded, it is transmitted to receiver client IO bus 490 and eventually is picked up by the receiver client unit's host processor (not shown). In one embodiment, the host processor controls video decoder/renderer 420 directly and actively reads the rendered data. In other embodiments, the functions of video decoder/renderer 420 are performed on the host via a software application. In cases where the host processor is incapable of such decoding tasks, video decoder/renderer 420 performs part of or all of the decoding tasks.

One implementation of the invention is as sets of computer readable instructions resident in the random access memory of one or more processing systems configured generally as described in FIGS. 1-4. Until required by the processing system, the set of instructions may be stored in another computer readable memory, for example, in a hard disk drive or in a removable memory such as an optical disk for eventual use in a CD drive or DVD drive or a floppy disk for eventual use in a floppy disk drive. Further, the set of instructions can be stored in the memory of another image processing system and transmitted over a local area network or a wide area network, such as the Internet, where the transmitted signal could be a signal propagated through a medium such as an ISDN line, or the signal may be propagated through an air medium and received by a local satellite to be transferred to the processing system. Such a signal may be a composite signal comprising a carrier signal, and contained within the carrier signal is the desired information containing at least one computer program instruction implementing the invention, and may be downloaded as such when desired by the user. One skilled in the art would appreciate that the physical storage and/or transfer of the sets of instructions physically changes the medium upon which it is stored electrically, magnetically, or chemically so that the medium carries computer readable information.

In the preceding detailed description of the figures, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
   determining if a first portion of a display stream is transmissible via a transmission link such that the display stream will be displayed in real time at a client device;
   compressing the first portion of the display stream in a first compression manner to produce a first compressed display stream portion when it is determined that the first portion of the display stream is not transmissible over the transmission link such that the display stream will be displayed in real time at the client device;

wherein the first portion of the display stream is determined to be transmissible such that the display stream will be displayed in real time when an expected time of transmission of a second portion of the display stream via the transmission link is within a predetermined tolerance of an actual time of transmission of the second portion of the display stream via the transmission link; and wherein the first portion of the display stream includes data compressed in a second compression manner different than the first compression manner, wherein the first compression manner represents a high degree of data compression than the second compression manner.

2. The method of claim 1, wherein the predetermined tolerance is determined based on an expected buffer fullness of a buffer of a receiving device connected to the transmission link.

3. The method of claim 1, wherein:
the display stream represents a series of display frames;
the first portion of the display stream represents a first sequence of one or more display frames of the series of display frames; and
the second portion of the display stream represents a second sequence of one or more display frames of the series of display frames prior to the first sequence.

4. The method of claim 1, wherein the first compression manner includes a first compression technique and the second compression manner includes a second compression technique different than the first compression technique.

5. The method of claim 1, wherein the first compression manner includes a compression technique and a first set of compression parameters and the second compression manner includes the compression technique and a second set of compression parameters different than the first set of compression parameters.

6. The method of claim 1, further comprising:
transmitting the first compressed display stream portion via the transmission link;
determining whether a second portion of the display stream is transmissible via the transmission link such that the display stream will be displayed in real time based on the transmission of the first compressed display stream portion via the transmission link; and
compressing the second portion of the display stream in a second compression manner to produce a second compressed display stream portion when it is determined that the second portion of the display stream is not transmissible via the transmission link such that the display stream will be displayed in real time, wherein the second compression manner represents a higher degree of data compression than the first compression manner.

7. The method of claim 6, wherein the second portion of the display stream is determined to be transmissible such that the display stream will be displayed in real time when an expected time of the transmission of the first compressed display stream portion via the transmission link is within a predetermined tolerance of an actual time of the transmission of the first compressed display stream portion via the transmission link.

8. The method of claim 1, further comprising:
transmitting the first portion of the display stream when it is determined that the first portion of the display stream is such that the display stream will be displayed in real time.

9. The method of claim 1, wherein the transmission link comprises a wireless link.

10. The method of claim 1, wherein the first compression manner comprises at least one of implementing increased encoding quantization factors, decreasing a video resolution, decreasing a frame size, or decreasing an audio resolution.

11. The method of claim 1, wherein the first portion of the display stream is compressed using a multimedia processor.

12. A method comprising:
receiving a first data stream representative of a series of display frames;
managing a degradation of the first data stream based on a bandwidth of a transmission link to generate a second data stream representative of the series of display frames, wherein a degree of degradation of the first data stream is incremented for successive portions of the second data stream until a first compressed portion of the second data stream is determined to be transmissible such that the second data stream will be displayed in real time;
transmitting the second data stream via the transmission link;
wherein the first compressed portion of the second data stream is determined to be transmissible such that the second data stream will be displayed in real time when an expected time of transmission of a second compressed portion of the second data stream via the transmission link is within a predetermined tolerance of an actual time of transmission of the second compressed portion of the second data stream via the transmission link; and
wherein the first data stream is degraded to generate the second data stream using a first compression technique and wherein the degree of degradation is incremented based on implementing different compression parameters for each of the successive portion of the first data stream.

13. The method of claim 12, wherein the degree of degradation of the first data stream is incremented further based on implementing different compression techniques for each of the successive portions of the first data stream.

14. The method of claim 12, wherein each portion of the successive portions of the second data stream comprises a different sequence of one or more display frames of the series of display frames.

15. The method of claim 12, wherein the transmission link comprises a wireless link.

16. A system comprising:
means for determining if a first portion of a display stream is transmissible via a transmission link such that the display stream will be displayed in real time;
means for compressing the first portion of the display stream in a first compression manner to produce a first compressed display stream portion when it is determined that the first portion of the display stream is not transmissible over the transmission link such that the display stream will be displayed in real time,
wherein the first portion of the display stream is determined to be transmissible such that the display stream will be displayed in real time when an expected time of transmission of a second portion of the display stream via the transmission link is within a predetermined tolerance of an actual time of transmission of the second portion of the display stream via the transmission link; and wherein the first portion of the display stream includes data compressed in a second compression manner different than the first compression manner, wherein the first compression manner represents a high degree of data compression than the second compression manner.

17. A computer readable memory embodying a computer program, the computer program comprising:

instructions to manipulate one or more processors to determine if a first portion of a display stream is transmissible via a transmission link such that the display stream will be displayed in real time; and instructions to manipulate one or more processors to compress the first portion of the display stream in a first compression manner to produce a first compressed display stream portion when it is determined that the first portion of the display stream is not transmissible over the transmission link such that the display stream will be displayed in real time;

wherein the first portion of the display stream is determined to be transmissible such that the display stream will be displayed in real time when an expected time of transmission of a second portion of the display stream via the transmission link is within a predetermined tolerance of an actual time of transmission of the second portion of the display stream via the transmission link; and wherein the first portion of the display stream includes data compressed in a second compression manner different than the first compression manner, wherein the first compression manner represents a high degree of data compression than the second compression manner.

18. A system comprising:

means for receiving a first data stream representative of a series of display frames;

means for managing a degradation of the first data stream based on a bandwidth of a transmission link to generate a second data stream representative of the series of display frames, wherein a degree of degradation of the first data stream is incremented for successive portions of the second data stream until a first compressed portion of the second data stream is determined to be transmissible such that the second data stream will be displayed in real time;

means for transmitting the second data stream via the transmission link;

wherein the first compressed portion of the second data stream is determined to be transmissible such that the second data stream will be displayed in real time when an expected time of transmission of a second compressed portion of the second data stream via the transmission link is within a predetermined tolerance of an actual time of transmission of the second compressed portion of the second data stream via the transmission link; and wherein the first data stream is degraded to generate the second data stream using a first compression technique and wherein the degree of degradation is incremented based on implementing different compression parameters for each of the successive portion of the first data stream.

19. A computer readable memory embodying a computer program, the computer program comprising:

instructions to manipulate one or more processors to receive a first data stream representative of a series of display frames;

instructions to manipulate one or more processors to manage a degradation of the first data stream based on a bandwidth of a transmission link to generate a second data stream representative of the series of display frames, wherein a degree of degradation of the first data stream is incremented for successive portions of the second data stream until a first compressed portion of the second data stream is determined to be transmissible such that the second data stream will be displayed in real time;

instructions to manipulate one or more processors to transmit the second data stream via the transmission link;

wherein the first compressed portion of the second data stream is determined to be transmissible such that the second data stream will be displayed in real time when an expected time of transmission of a second compressed portion of the second data stream via the transmission link is within a predetermined tolerance of an actual time of transmission of the second compressed portion of the second data stream via the transmission link; and wherein the first data stream is degraded to generate the second data stream using a first compression technique and wherein the degree of degradation is incremented based on implementing different compression parameters for each of the successive portion of the first data stream.

* * * * *